United States Patent Office 2,974,759
Patented Mar. 14, 1961

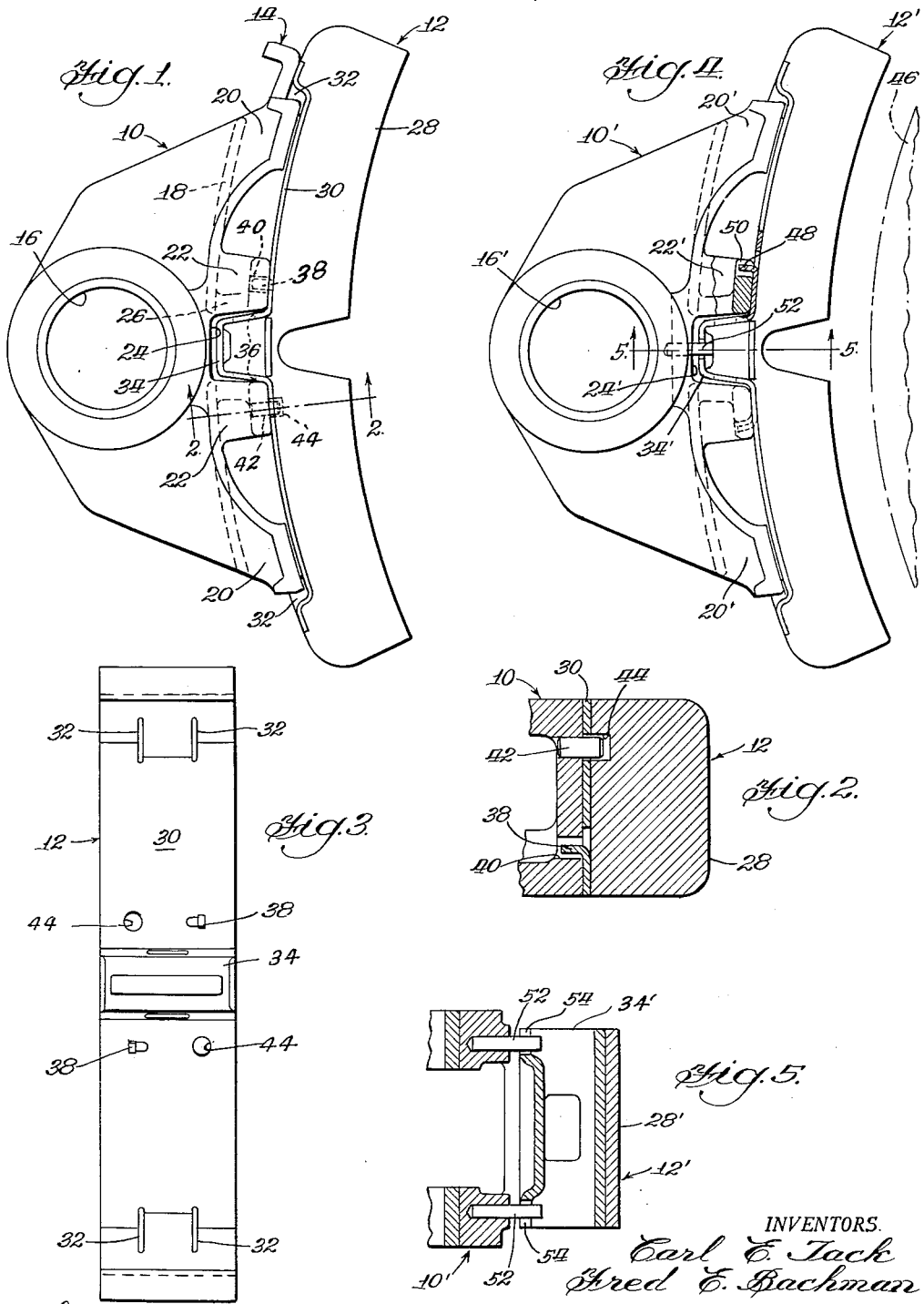

2,974,759

BRAKE HEAD AND SHOE ASSEMBLY

Carl E. Tack, Chicago, and Fred E. Bachman, Granite City, Ill., assignors to American Steel Foundries, Chicago, Ill., a corporation of New Jersey Filed Oct. 22, 1956, Ser. No. 617,308

3 Claims. (Cl. 188—243)

The present invention relates to brake head and shoe assemblies, and particularly such assemblies for railway cars.

In railway car braking arrangements, at least in certain instances, brake shoes are utilized which are of certain composition different from the conventional cast iron brake shoes. Also in certain instances both kinds of brake shoes may be utilized, i.e., cast iron and composition.

The selection of the kinds of braking shoe determines the braking effect achieved, and in replacement of the shoes, as when worn, it is of course desired that the same kind of shoes be utilized in replacement in accordance with the original intent, and that inadvertent interchangeability of the different kinds of shoes be prevented.

An object therefore of the invention is to provide a brake head and shoe having novel construction preventing inadvertent interchanging of either the head or the shoe with a head or shoe of another kind.

Another object is to provide a brade head and shoe of the character just noted, which includes interfitting conformations preventing interchangeability, but in which the conformations constitute a minimum change from conventional construction whereby to economize in manufacture thereof.

A further object is to provide a brake head and shoe of the foregoing character, in which a recess in one of the members, e.g., in the head, that is otherwise provided in conventional construction, is utilized for locating a projection, whereby to minimize the clearance necessary between the head and wheel through which the shoe is inserted into place in replacement in a railway car.

Other objects and advantages of the invention will appear from the following detail description taken in conjunction with the accompanying drawings in which:

Figure 1 is a side elevational view of a brake head and shoe assembly embodying the principles of the present invention;

Figure 2 is a sectional view taken on line 2—2 of Figure 1;

Figure 3 is an elevational view of the rear or inner side of the brake shoe of Figure 1;

Figure 4 is a side elevational view of brake head and shoe assembly of modified form, and Figure 5 is a sectional view taken on line 5—5 of Figure 4.

Referring now in detail to the drawings, and in particular to Figures 1 to 3 inclusive, a brake head and brake shoe are shown, which include in large part a standard construction. The assembly includes a brake head 10, a brake shoe 12, and a key 14 for securing them together. The brake head 10 is provided with an aperture 16 for mounting the assembly on a brake hanger (not shown) and includes a front wall 18 and spaced end lugs 20, 20 and intermediate lugs 22, 22 defining a central recess 24 therebetween. The end lugs 20, 20 are each made up of two transversely spaced elements between which the key 14 is interposed. The intermediate lugs 22, 22 have apertures 26 for receiving the key 14. The lugs 20, 20 and 22, 22 have front portions or surfaces engageable with the brake shoe 12 in operative position of the latter on the brake head. The brake head thus far described is of conventional construction and further details thereof may be obtained from Car Builders Cyclopedia of American Practice; 1949–51, 18th edition, page 911 (top illustration).

The shoe 12 illustrated in Figure 1 includes a braking element 28 and a rear or backing element 30 which in the present illustration may be in the form of a separate plate. Shoes in common use in the industry and as referred to in the present instance include two kinds; namely, one having braking material of special composition and the other having braking material of cast iron. In the former case the braking material 28 is secured to the backing plate 30 and in the latter case these two elements may be integral, but for present purposes both may be considered as having a backing plate which constitutes the means of securement of the shoe to the brake head, since because of the inclusion of certain features of the invention to be referred to below, the brake shoe having cast iron braking material may be supplied with a separate backing plate. The backing plate 30 has lug elements 32 which fit between the lug elements 20 on the brake head, as shown in Figure 1, when the shoe is fitted to the head. The backing plate also has a central projection 34 fitted in the central recess 24 in the brake head. This central projection is provided with apertures 36 for receiving the key 14. As will be understood in accordance with standard construction, the key thus retains the shoe and the head, the shoe bearing on the head on the front faces of the intermediate lugs 22 and at the end lugs 20, the engagement in the latter place being through the lug elements 32 on the shoe. The construction of the shoe thus far described is conventional or standard.

As noted above, it is desired to prevent inadvertent interchangeability of the shoes on the heads, so that in replacement of worn shoes the same kind of shoe will be used for replacement as originally intended in the braking arrangement as designed. For example, if it was originally designed that a brake shoe having braking material of special composition be utilized, a cast iron shoe should not be used in replacement thereof, and vice versa.

In order to prevent inadvertent replacement of shoes different from that originally designed, the shoes and heads are provided with certain interfitting projections and apertures. Referring first to the shoe, the backing plate 30 is provided with projections 38 which for convenience may be stamped or punched from the material of the plate. These projections are turned out to a position perpendicular to the plate. The brake head is provided with apertures 40, in number and location corresponding to the projections 38 for receiving the latter. When the brake shoe is fitted to the head and secured thereto, as illustrated in Figure 1, these projections extend freely into the apertures.

The brake head is also preferably fitted with projections which may be in the form of pins 42 suitably secured in the brake head and projected forwardly therefrom. In the present instance these pins are fitted in the intermediate lugs 22 and the brake shoe is provided with cooperating apertures 44 extending through the backing plate and the necessary distance into the braking material.

It is preferred that the respective projections and apertures be arranged symmetrically so that the shoe can be fitted to the head in either end-to-end position, i.e., the respective projections and apertures are arranged symmetrically about a central fore-and-aft axis in the shoe.

A shoe such as shown and thus far described can be fitted to the head described. Each part (i.e. shoe or head)

has projections received in apertures in the other part. Assume, by way of example, that the head illustrated is of the type having special composition braking material and it is attempted to fit a conventional cast iron brake shoe to the head contrary to the original design of the braking arrangement in which the replacement is to be made. Such cast iron shoe would be "ejected" by the pins 42, since its rear surface is imperforate and without apertures to receive the pins 42. The shoe would not fit into proper position against the shoe-receiving elements of the head; namely, the lugs 20, 20 and 22, 22.

Assume, on the other hand, a head with which a conventional cast iron shoe is to be associated. This head, in accordance with the present invention would have imperforate front shoe-receiving surfaces on the lugs 22, 22. Then in an attempt to fit the shoe 12, having braking material of special composition to such head, the projections 38 would "eject" the shoe, i.e., in the absence of apertures in such head the projections 38 would prevent the shoe from fitting into proper position on the head for securement thereto.

In accordance with procedure heretofore followed in the industry, brake heads and shoes have been of conventional and standard construction at least from the standpoint of elements cooperating in securement of the shoes to the heads. Such provision does, of course, have numerous advantages, one of the advantages being simplification in design and resulting economy. It is on the other hand desired that interchangeability of the two kinds of shoes be prevented and such can be prevented by an extremely simple change in what is an otherwise standard construction, in accordance with the principles of the present invention.

Figures 4 and 5 illustrate a modified form of the invention. In consideration of the present form, it is desired to point out that it is at times necessary in replacing a worn shoe in the car truck, to "thread" the shoe into position on the head, i.e., to work the shoe into position by movement in arcuate direction in the space between the head and the wheel. In such instance it is, of course, desired to eliminate as much as possible obstructions to this operation in view of the limited space usually encountered.

The head and shoe assembly of Figure 4 includes the head 10' and shoe 12' as in the first embodiment. In the present instance the assembly is shown in association with a wheel 46 at a certain predetermined spacing relative to the shoe, which will be referred to again hereinbelow. The brake shoe 12' has one or more projections 48 similar in all material respects to the projections 38 described above and the brake head has apertures 50 for receiving the projections 48, in the manner described in connection with the first embodiment. However, in the present instance, the projections such as 42 in the first embodiment are eliminated. In threading the shoe into position as mentioned above, the central projection 34' must, of course, clear the lugs 20' and 22' and there must be sufficient space between the head and the wheel to receive the shoe. Such spacing is usually not much greater than the thickness (in lateral direction) of the shoe plus the thickness in the same direction of the projection 34'. Hence, if projection 42 were projected from the front faces of the lugs 22', additional spacing equivalent to the length of these projections would be necessary between the wheel and the head. Since the projection 34' is provided on the shoe for reasons other than the present invention, this feature is utilized in eliminating projections on the front face of the head. The projections in the present instance indicated at 52 are provided in the floor of the recess 24'. These projections may take the form of pins and may be suitably secured in the head in a known manner. The innermost end wall of the projection 34' is provided with notches or apertures 54 (Figure 5) at each of its transverse edges for receiving the pins.

In the present instance a two-way interfitting projection and aperture arrangement is provided without the requirement for space in addition to that required for a standard head and shoe. The projections 48 are preferably much less in height than the central projection 34', and at any rate no greater in height.

We claim:

1. In a set of detachably interconnectable mateable brake head and brake shoe members, one of which has standard lug means protruding therefrom receivable within complementary standard recess means of the other to afford interlocking engagement to prevent relative vertical movement therebetween, interfitting means located on the recess means and on the lug means of said mateable members for ensuring that the mateable members are connectable only with each other or with like corresponding members, said interfitting means comprising auxiliary complementary mateable projection means and aperture means presented by the lug and recess means of said mateable members for interlocking engagement with each other which interlocking engagement is in addition to the interlocking engagement afforded by said lug means and said recess means.

2. A set according to claim 1, wherein the projection means and aperture means of said interfitting means are located on the recess means and on the lug means, respectively, of said mateable members.

3. A set according to claim 1, wherein said interfitting means affords interlocking engagement to prevent relative horizontal movement between said mateable members.

References Cited in the file of this patent

UNITED STATES PATENTS

| 1,867,348 | Blume | July 12, 1932 |
| 1,960,431 | Armbrust | May 29, 1934 |
| 2,088,126 | Wright | July 27, 1937 |
| 2,107,521 | Busch | Feb. 8, 1938 |
| 2,252,446 | Teker | Aug. 12, 1941 |
| 2,791,299 | Bonkowski | May 7, 1957 |

FOREIGN PATENTS

| 573,605 | Great Britain | Nov. 28, 1945 |